G. A. HOWE.

Cotton Picker.

No. 2,138. Reissued Dec. 26, 1865.

Witnesses:
John Coan
I. L. Coombs

Inventor
George A. Howe

THE ECKERT LITHOGRAPHING CO., WASHINGTON, D. C.

UNITED STATES PATENT OFFICE.

GEORGE A. HOWE, OF BROOKLYN, NEW YORK.

IMPROVEMENT IN COTTON-PICKERS.

Specification forming part of Letters Patent No. 13,877, dated December 4, 1855; Reissue No. 2,138, dated December 26, 1865.

DIVISION No. 2.

*To all whom it may concern:*

Be it known that I, GEORGE A. HOWE, of Brooklyn, in the county of Kings and State of New York, have invented a new and useful Toothed Chain for Harvesting Cotton and for Gathering or Moving other Fibrous Materials; and I do hereby declare that the following is a full and exact description thereof, reference being had to the accompanying drawings, and the letters of reference marked thereon, in which—

Figure 1:
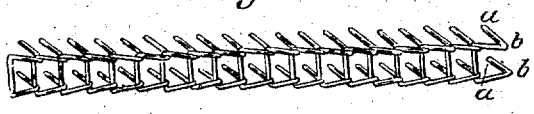
Figure 2:
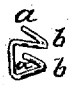
Figure 3:
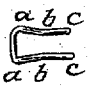
Figure 4:
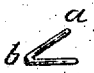

Figure 1 is a perspective view of my chain. Fig. 2 is a detached link of the chain in perspective. Fig. 3 is a link partially formed; and Fig. 4 is a side view of a detached link.

To enable others skilled in the art to make and use my invention, I will proceed to describe its construction and operation.

The links of the chain are made of metallic wires or bars, the length of each wire or bar being adapted to the required size of the chain. The wire to form a link is first bent into the form of a staple, as shown by Fig. 3. The two shanks *a b c* are then both bent in the same direction, at *b*, so that the part *a b* will form a rather acute angle with the part *c b*, and both of said parts forming substantially the same angle with the central part of the wire. This makes a hook on each side of the link, as shown in Fig. 4. The angular points or short bends of these hooks *b b* incline slightly toward each other, and the points or teeth *a b* spread or diverge from each other in a like degree, which prevents the too easy separation of the links. The links are joined or hooked together by slightly pressing the points *a a* toward each other, and when the pressure is released said points will immediately spring apart to their normal positions, so that the links cannot be separated until said points are again pressed inward. When the links are thus joined and hooked together they form a durable and flexible chain of teeth, as shown in Fig. 1, which is specially adapted to my cotton-harvesting machine, but is also adapted to gathering and moving other fibrous materials, as well as to other economical uses.

An important advantage pertaining to this chain, in addition to its practical utility, is the cheapness of its manufacture and the facility with which it may be separated at any link when desired, or its length increased or diminished in order to adapt the same chain to divers uses.

What I claim as my invention, and desire to secure by this division of my Letters Patent, is—

A toothed chain constructed substantially as herein described.

GEORGE A. HOWE.

In presence of—
JOHN COON,
T. L. COOMBS.